(12) United States Patent
Kouyama et al.

(10) Patent No.: US 7,848,095 B2
(45) Date of Patent: Dec. 7, 2010

(54) STRUCTURE OF MOUNTING ELECTRONIC DEVICE INTO HOUSING

(75) Inventors: Tomoaki Kouyama, Souka (JP); Jun Matsui, Tohkai (JP)

(73) Assignee: Buffalo Inc., Nagoya (JP)

( * ) Notice: Subject to any disclaimer, the term of this patent is extended or adjusted under 35 U.S.C. 154(b) by 93 days.

(21) Appl. No.: 12/396,867

(22) Filed: Mar. 3, 2009

(65) Prior Publication Data
US 2009/0219680 A1 Sep. 3, 2009

(30) Foreign Application Priority Data
Mar. 3, 2008 (JP) .......................... P2008-052687

(51) Int. Cl.
*G06F 1/16* (2006.01)
(52) U.S. Cl. .............................. 361/679.31; 360/97.02; 429/532; 257/642; 365/163
(58) Field of Classification Search ............ 361/679.31, 361/679.01, 679.55, 679.3, 679.33, 679.2, 361/679.34, 679.39, 679.5, 679.43; 360/69, 360/245.9, 97.02; 429/231.8, 532, 479; 349/191, 349/194; 257/329, 642, 439; 365/189.011, 365/211, 189.15, 163, 148; 206/320, 1.7; 359/2, 290
See application file for complete search history.

(56) References Cited
U.S. PATENT DOCUMENTS
2006/0133030 A1* 6/2006 Takahashi et al. ........... 361/685
2006/0268444 A1* 11/2006 DeCenzo et al. .............. 360/69
2009/0231799 A1* 9/2009 Kouyama .............. 361/679.31

FOREIGN PATENT DOCUMENTS
JP 7-29363 1/1995
JP 2002-8364 1/2002

OTHER PUBLICATIONS
U.S. Appl. No. 12/396,765, filed Mar. 3, 2009, Kouyama.

* cited by examiner

*Primary Examiner*—Hung V Duong
(74) *Attorney, Agent, or Firm*—Oblon, Spivak, McClelland, Maier & Neustadt, L.L.P.

(57) ABSTRACT

In a structure of mounting an electronic device into a housing according to the present invention, the electronic device has the following structure. First and second storage devices are connected to respective connecting parts provided on a substrate. Convex portions provided on a first supporting member are fitted from above into a gap between the first storage device and the substrate and a gap between the second storage device and the substrate, respectively. Convex portions provided on a second supporting member are fitted from below into the gap between the first storage device and the substrate and the gap between the second storage device and the substrate, respectively. The electronic device into which the first and second supporting members are fitted is inserted into the housing from an opening thereof, and fixed within the housing by the housing and a cover.

10 Claims, 17 Drawing Sheets

STRUCTURE OF MOUNTING ELECTRONIC DEVICE INTO HOUSING

CROSS REFERENCE TO RELATED APPLICATION

This application is based upon and claims the benefit of priority from the prior Japanese Patent Application No. P2008-052687, filed on Mar. 3, 2008; the entire contents of which are incorporated herein by reference.

BACKGROUND OF THE INVENTION

1. Field of the Invention

The present invention relates to a structure of mounting an electronic device into a housing.

2. Related Art

In recent years, an amount of data to be stored in a computer of each user has been increasing. To increase the data amount that can be stored, each user takes such measures as adding an electronic device such as an external hard disk device or a network hard disk drive.

In general, such an electronic device is mounted into a housing, with a storage device being connected to a connector provided on a substrate.

However, in the mounting structure described above, an electronic device is mounted into a housing by use of a fastening member such as a screw. This causes a problem of requiring the fastening member, such as a screw, to be attached to a predetermined member of the electronic device before the electronic device is mounted into the housing, which consumes more man-hours.

SUMMARY OF THE INVENTION

Thus, the present invention has been made in light of the above problem. An object of the present invention is to provide a structure of mounting an electronic device into a housing that makes it possible to mount the electronic device into the housing without using a fastening member such as a screw.

An aspect of the present invention is summarized as a structure of mounting an electronic device into a housing, including: a first supporting member configured to support the electronic device; a second supporting member configured to support the electronic device; and a cover configured to cover an opening formed in the housing. The electronic device includes: a substrate; at least one connecting part provided on the substrate; and a storage device to be connected to the connecting part. In the structure, the first supporting member is mounted to the electronic device by fitting a convex portion from above into a gap between the storage device and the substrate, the convex portion being provided on the first supporting member; the second supporting member is mounted to the electronic device by fitting a convex portion from below into a gap between the storage device and the substrate, the convex portion being provided on the second supporting member; and the electronic device to which the first supporting member and the second supporting member are mounted is inserted from the opening into the housing, and fixed within the housing by the housing and the cover.

In the aspect of the present invention, the connecting part can include a first connecting part provided on a front surface of the substrate and a second connecting part provided on a back surface of the substrate, and the storage device can include a first storage device to be connected to the first connecting part and a second storage device to be connected to the second connecting part. In the structure, convex portions provided on the first supporting member can be fitted from above into a gap between the first storage device and the substrate and a gap between the second storage device and the substrate; and convex portions provided on the second supporting member can be fitted from below into a gap between the first storage device and the substrate and a gap between the second storage device and the substrate.

In the aspect of the present invention, the connecting part can include: a first connecting part provided on a front surface of the substrate; and a second connecting part provided on a back surface of the substrate. The storage device can be connected to the first connecting part, and a space occupying body can be connected to the second connecting part. Convex portions provided on the first supporting member can be fitted from above into a gap between the storage device and the substrate and a gap between the space occupying body and the substrate; and convex portions provided on the second supporting member can be fitted from below into a gap between the storage device and the substrate and a gap between the space occupying body and the substrate.

In the aspect of the present invention, a protrusion provided on the first supporting member can be fitted from above into a hole formed in the storage device; and a protrusion provided on the second supporting member can be fitted from below into a hole formed in the storage device.

In the aspect of the present invention, the connecting part can include a first connecting part provided on a front surface of the substrate and a second connecting part provided on a back surface of the substrate, and the storage device can include a first storage device to be connected to the first connecting part and a second storage device to be connected to the second connecting part. Protrusions provided on the first supporting member can be fitted from above into holes formed in the first storage device and the second storage device; and protrusions provided on the second supporting member can be fitted from below into holes formed in the first storage device and the second storage device.

In the aspect of the present invention, the connecting part can include: a first connecting part provided on a front surface of the substrate; and a second connecting part provided on a rear surface of the substrate. The storage device can be connected to the first connecting part, and a space occupying body can be connected to the second connecting part. Protrusions provided on the first supporting member can be fitted from above into holes formed in the storage device and the space occupying body; and protrusions provided on the second supporting member can be fitted from below into holes formed in the storage device and the space occupying body.

In the aspect of the present invention, in the electronic device, a first heat transferring body can be inserted between the substrate and the first storage device; and in the electronic device, a second heat transferring body can be inserted between the substrate and the second storage device. Convex portions provided on the first supporting member and convex portions provided on the second supporting member can be fitted into a gap between the first heat transferring body and the substrate and a gap between the second heat transferring body and the substrate.

In the aspect of the present invention, in the electronic device, a first heat transferring body can be inserted between the substrate and the storage device; and in the electronic device, a second heat transferring body can be inserted between the substrate and the space occupying body. Convex portions provided on the first supporting member and convex portions provided on the second supporting member can be fitted into a gap between the first heat transferring body and the substrate and a gap between the second heat transferring body and the substrate.

In the aspect of the present invention, in the electronic device, a first heat transferring body is inserted between the substrate and the first storage device. Convex portions provided on the first supporting member and convex portions provided on the second supporting member are fitted into a gap between the first heat transferring body and the substrate and a gap between the second storage device and the substrate.

In the aspect of the present invention, in the electronic device, a first heat transferring body can be inserted between the substrate and the storage device. Convex portions provided on the first supporting member and convex portions provided on the second supporting member can be fitted into a gap between the first heat transferring body and the substrate and a gap between the space occupying body and the substrate.

DETAILED DESCRIPTION OF THE INVENTION

Structure of Mounting an Electronic Device into a Housing According to a First Embodiment of the Present Invention A structure of mounting an electronic device 100 into a housing 8, according to a first embodiment of the present invention, will be described with reference to FIGS. 1 to 5.

Figure 1:
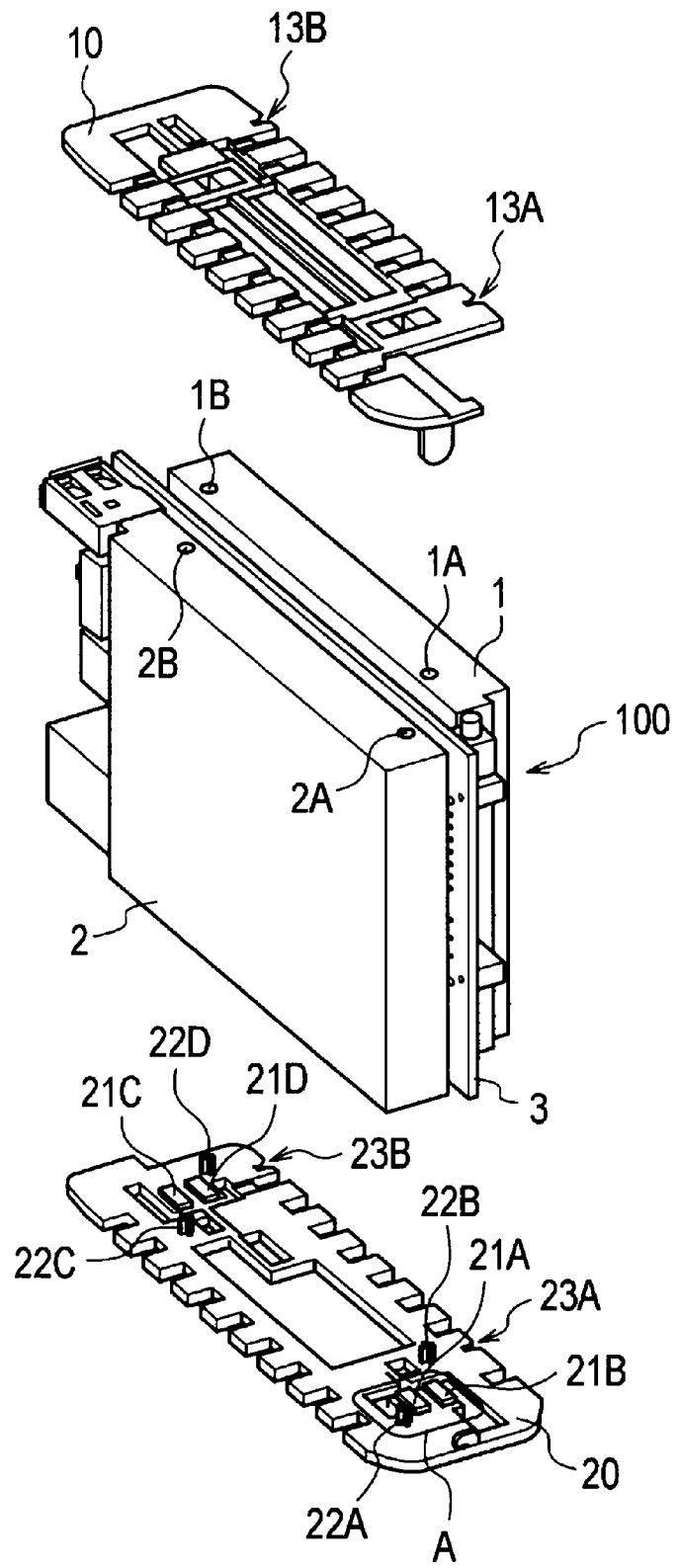
FIG. 1 is a view for describing how a first supporting member and a second supporting member are mounted to a first storage device and a second storage device in an electronic device according to a first embodiment of the present invention.
Figure 2:
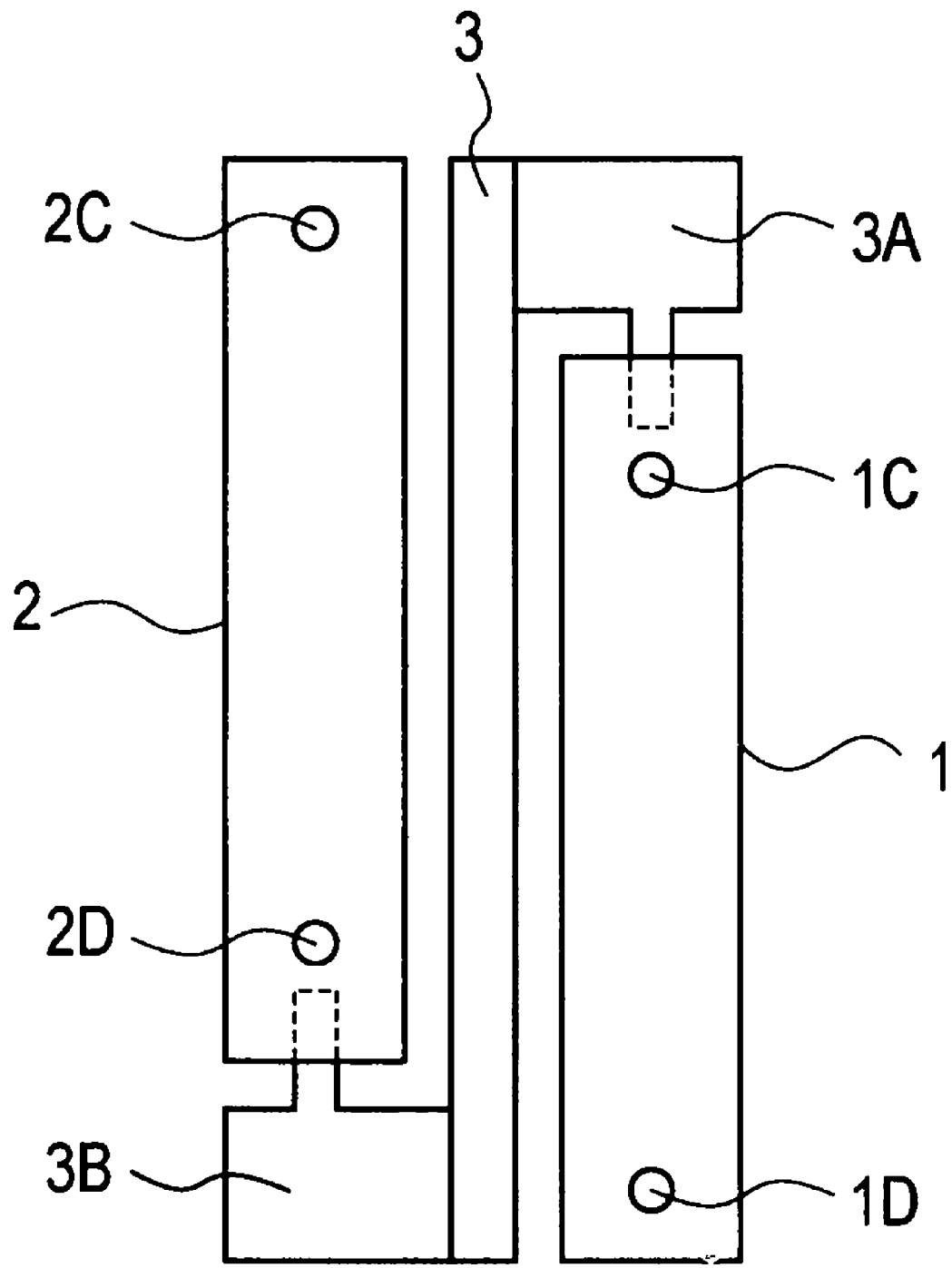
FIG. 2 is a plan view, viewed from below, of the electronic device according to the first embodiment of the present invention.

As shown in FIGS. 1 and 2, the electronic device 100 according to the embodiment has a structure in which storage devices 1 and 2 are connected to connectors (connecting parts) 3A and 3B provided on a substrate 3, respectively.

Alternatively, the electronic device 100 according to the embodiment may have a structure in which the storage devices 1 and 2 are connected to through-holes (connecting parts) provided on the substrate 3 by use of external connectors.

In the electronic device 100 according to the embodiment has a structure in which the storage device 1 (a first storage device) is connected to the connector 3A or the through-hole (wiring hole) provided on a front surface of the substrate 3, and the storage device 2 (a second storage device) is connected to the connector 3B or the through-hole formed on a back surface of the substrate 3.

An external hard disk device or a network hard disk drive, for example, is assumed here as the electronic device according to the embodiment. However, the present invention can be applied to any electronic device having the structure described above.

In addition, as shown in FIGS. 1 and 2, the electronic device according to the embodiment has a structure in which the storage devices 1, 2 are connected with the connectors 3A and 3B, with the largest surfaces of the storage devices 1, 2 being substantially parallel to the front surface and the back surface of the substrate 3, respectively.

Figure 3:
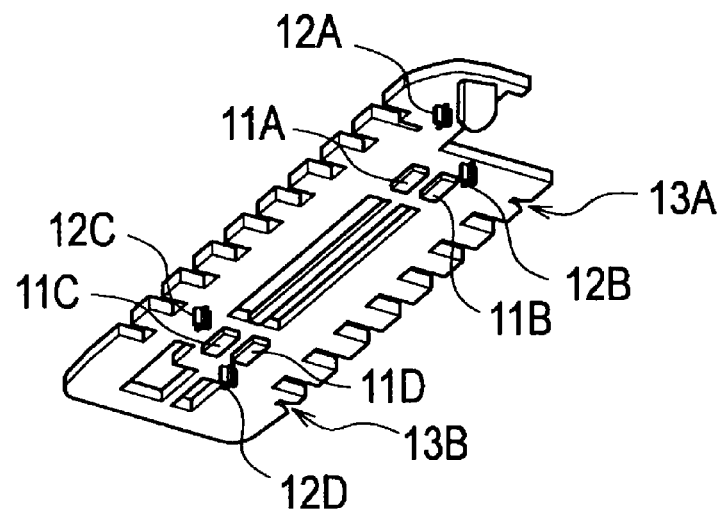
FIG. 3 is a view for describing a configuration of the first supporting member for supporting the electronic device according to the first embodiment of the present invention.

In addition, as shown in FIG. 3, a first supporting member 10 is provided with convex portions 11A, 11B, 11C, and 11D, protrusions 12A, 12B, 12C, 12D, and notches 13A, 13B. Likewise, as shown in FIGS. 1 and 4, a second supporting member 20 is provided with convex portions 21A, 21B, 21C, 21D, protrusions 22A, 22B, 22C, 22D, and notches 23A, 23B.

Figure 4:
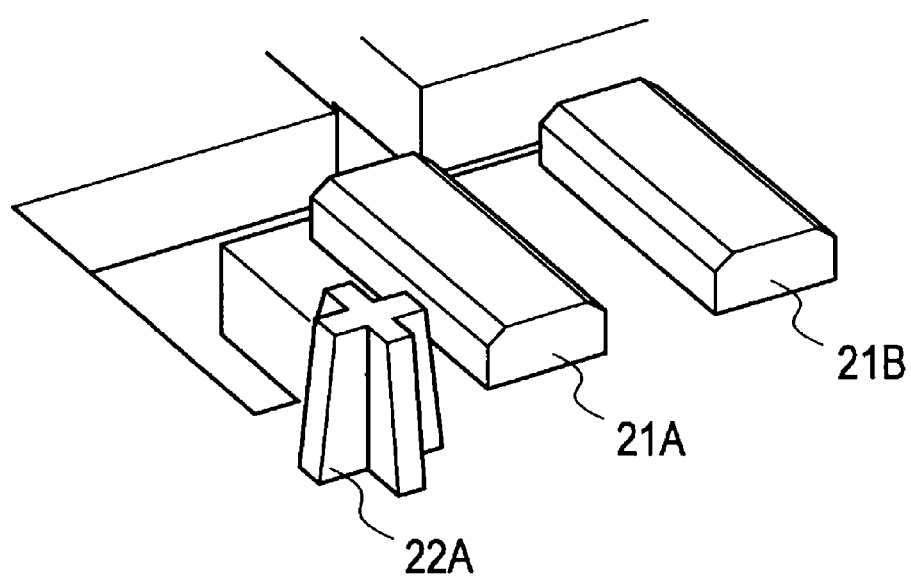
FIG. 4 is an enlarged view of an area A in the second supporting member according to the first embodiment of the present invention.

FIG. 4 is an enlarged view of an area A of the second supporting member 20 shown in FIG. 1, showing the convex portions 21A, 21B and the protrusion 22A which are provided on the second supporting member 20.

Herein, the protrusions 12A, 12B, 12C, 12D and the protrusions 22A, 22B, 22C, 22D may be formed as a cross-shaped rib, a cylinder or the like.

In the embodiment, the first supporting member 10 is mounted to the electronic device 10 by fitting the convex portions 11B and 11D as well as 11A and 11C provided on the first supporting member 10 from above into a gap between the storage device 1 and the substrate 3 as well as a gap between the storage device 2 and the substrate 3, respectively.

Similarly, in the embodiment, the second supporting member 20 is mounted to the electronic device 100 by fitting the convex portions 21B and 21D as well as 21A and 21C from below into a gap between the storage device 1 and the substrate 3 as well as a gap between the storage device 2 and the substrate 3, respectively.

In addition, in the embodiment, the protrusions 12B and 12D as well as 12A and 12C provided on the first supporting member 10 are fitted from above into the holes 1A, 1B provided in the storage device 1 and the holes 2A, 2B provided in the storage device 2, respectively.

Furthermore, in the embodiment, the protrusions 22B and 22D as well as 22A and 22C provided on the second supporting member 20 are fitted from below into the holes 1C, 1D provided in the storage device 1 and the holes 2C, 2D provided in the storage device 2, respectively.

Herein, the holes 1A, 1B, 1C, 1D provided in the storage device 1 and the holes 2A, 2B, 2C, 2D provided in the storage device 2 may be a circular hole or a square hole as long as the protrusions 12A, 12B, 12C, 12D and the protrusions 22A, 22B, 22C, 22D can be fitted into them.

Figure 5:
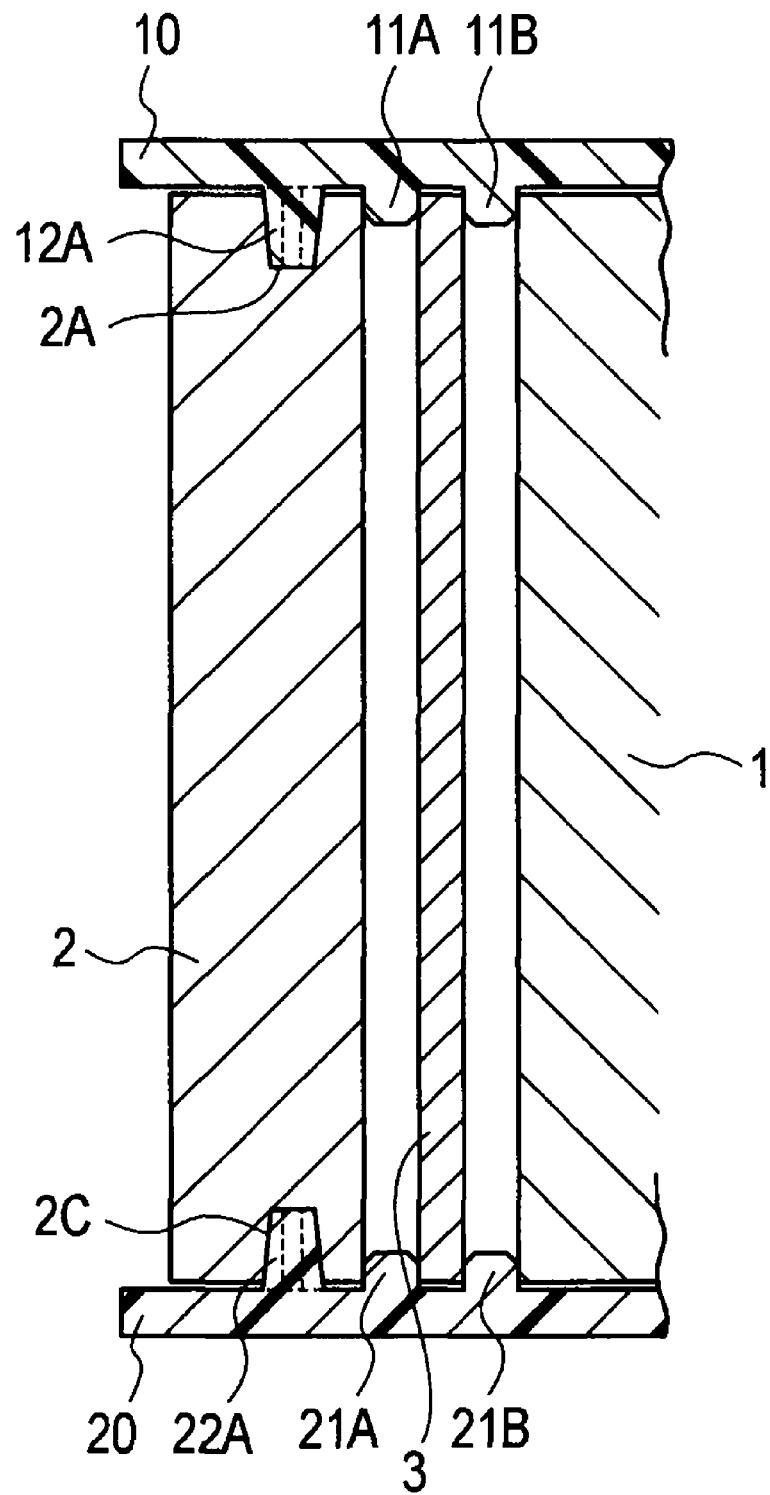
FIG. 5 is a cross-sectional view, taken along the line A-A', of the electronic device according to the first embodiment of the present invention.

FIG. 5 is a cross-sectional view, taken along the line A-A' (see FIG. 6), of the electronic device 100 to which the first supporting member 10 and the second supporting member 20 are mounted.

Figure 6:
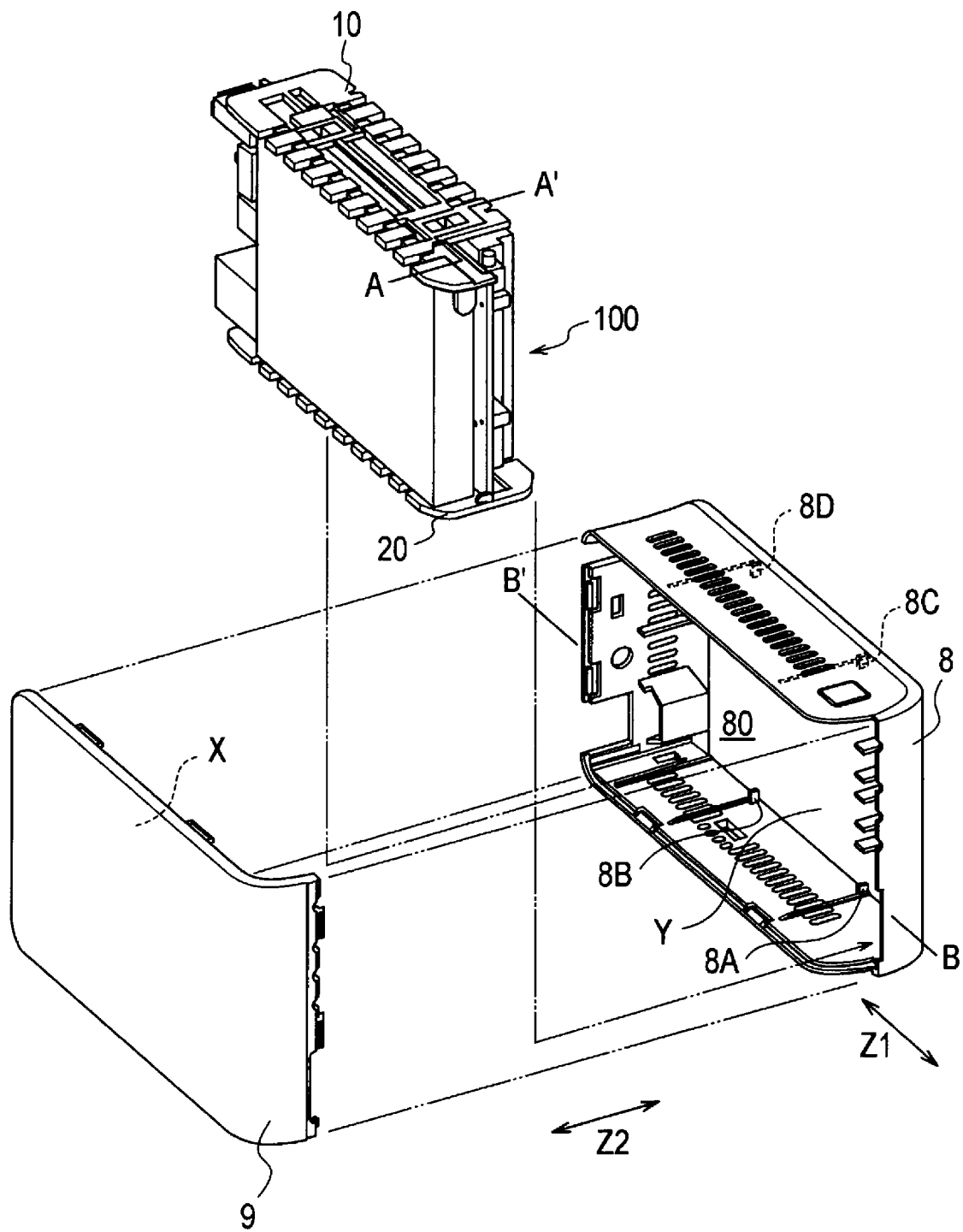
FIG. 6 is a view for describing how the electronic device according to the first embodiment of the present invention is inserted into the housing.

In addition, as shown in FIG. 6, within the housing 8, positioning parts 8A, 8B are provided on a lower surface, and positioning parts 8C, 8D are provided on an upper surface.

In the embodiment, the electronic device 100 is inserted into the housing 8 through an opening 80 of the housing 8 by moving the electronic device 100, to which the first supporting member 10 and the second supporting member 20 are mounted, into the housing 8 through the opening 80 of the housing 8.

Consequently, positioning, in direction Z1 within the housing 8, of the electronic device 100 to which the first supporting member 10 and the second supporting member 20 are mounted is performed by the notches 13A, 13B, 23A, 23B and the positioning parts 8A, 8B, 8C, 8D.

In addition, in the embodiment, after being inserted into the housing 8, the electronic device 100 to which the first supporting member 10 and the second supporting member 20 are mounted is fixed within the housing 8 by the housing 8 and a cover 9.

Specifically, the first supporting member 10 and the second supporting member 20 mounted to the electronic device 100 are positioned in the direction Z1 within the housing 8 and fixed within the housing 8, by being supported by an inner lateral side X of the cover 9 and by a lateral side Y that is within the housing 8 and opposed to the inner lateral side X of the cover 9.

Figure 7:
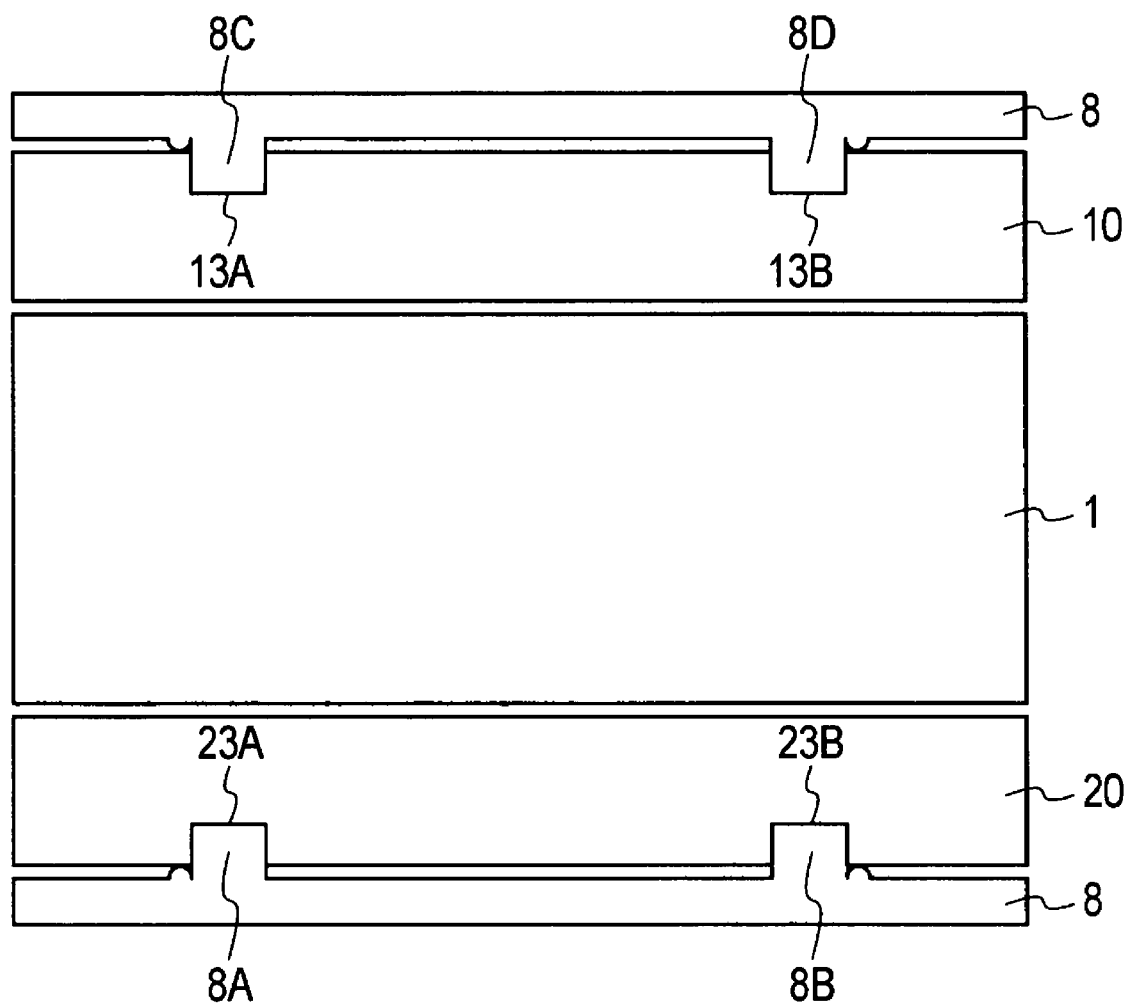
FIG. 7 is a cross-sectional view, taken along the line B-B', of the electronic device according to the first embodiment of the present invention.

FIG. 7 is a cross-sectional view, taken along the line B-B' (see FIG. 6), of the electronic device 100 mounted within the housing 8.

The electronic device 100 is fixed by the first supporting member 10 and the second supporting member 20, and the electronic device 100 to which the first supporting member 10 and the second supporting member 20 are mounted is fixed by the lateral side Y within the housing and the inner lateral side X of the cover 9. Therefore, with the structure of mounting the electronic device into the housing according to the embodiment, the electronic device 100 can be mounted within the housing 8 without using a fastening member such as a screw or the like.

Second Embodiment of the Present Invention

A structure of mounting an electronic device into a housing according to a second embodiment of the present invention will be described with reference to FIGS. 8 to 10.

Figure 8:
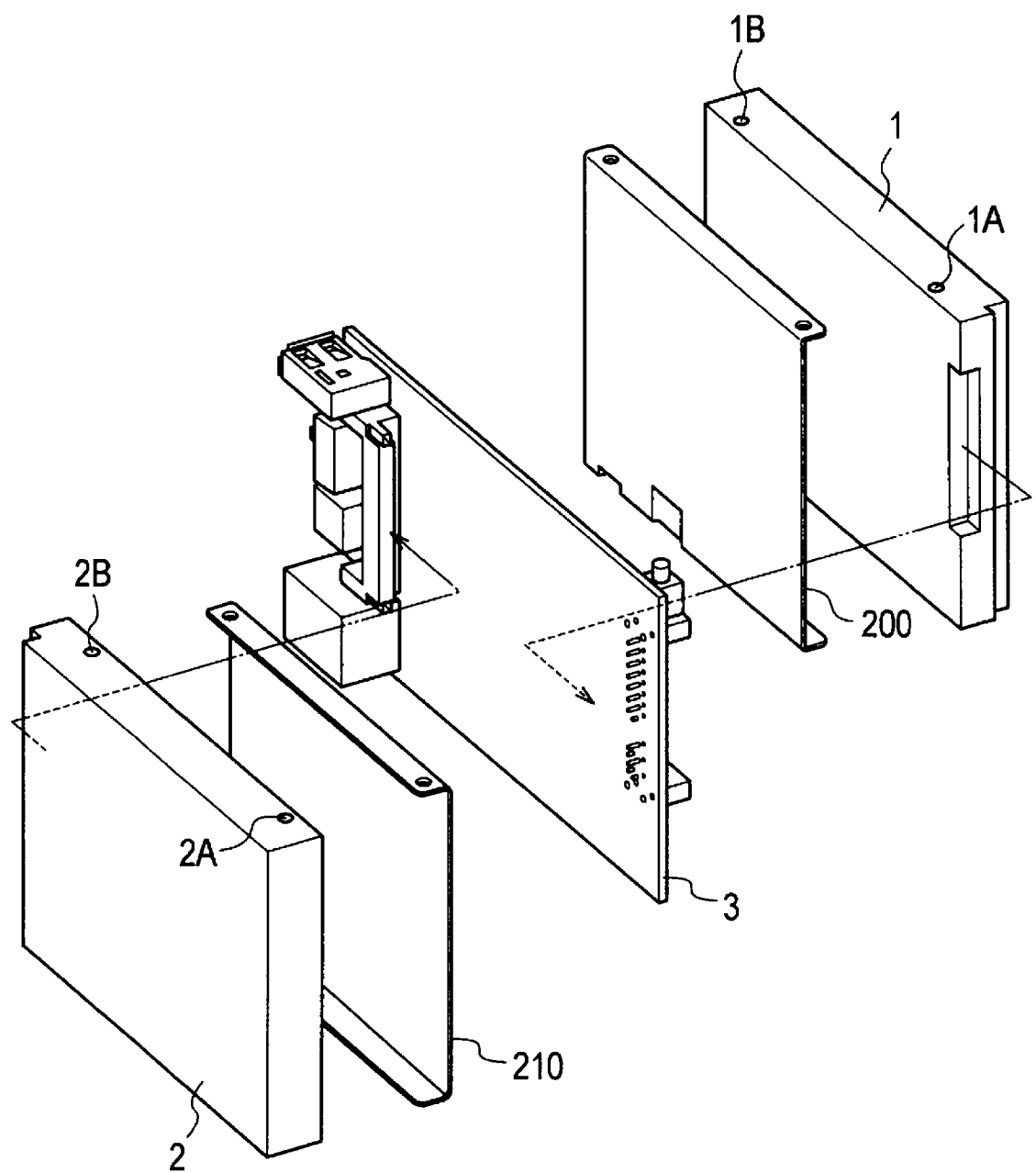
FIG. 8 is an exploded perspective view of an electronic device according to a second embodiment of the present invention.
Figure 9:
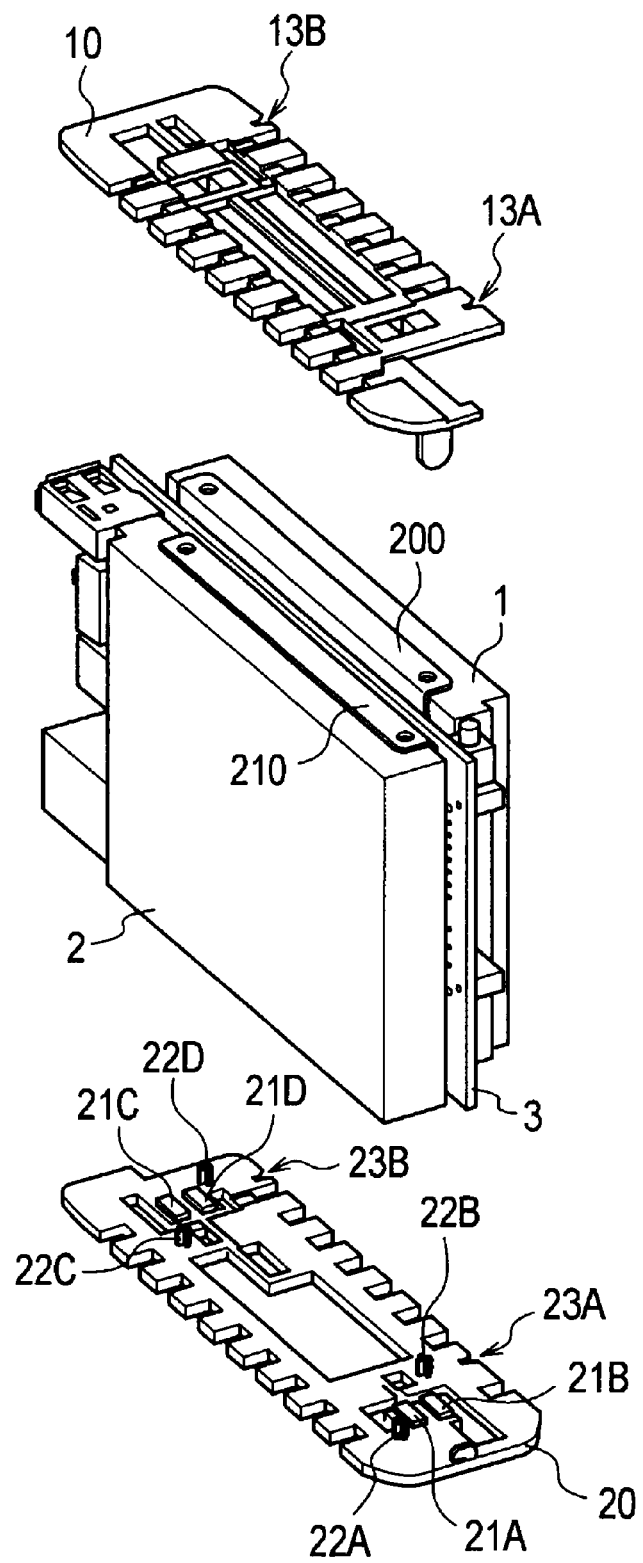
FIG. 9 is a view for describing how a first supporting member and a second supporting member are mounted to a first storage device and a second storage device in the electronic device according to the second embodiment of the present invention.

As shown in FIGS. 8 and 9, in the embodiment, the electronic device 100 has a structure in which a first heat transferring body 200 is inserted between a substrate 3 and a storage device 1 and a second heat transferring body 210 is inserted between the substrate 3 and a storage device 2.

Figure 10:
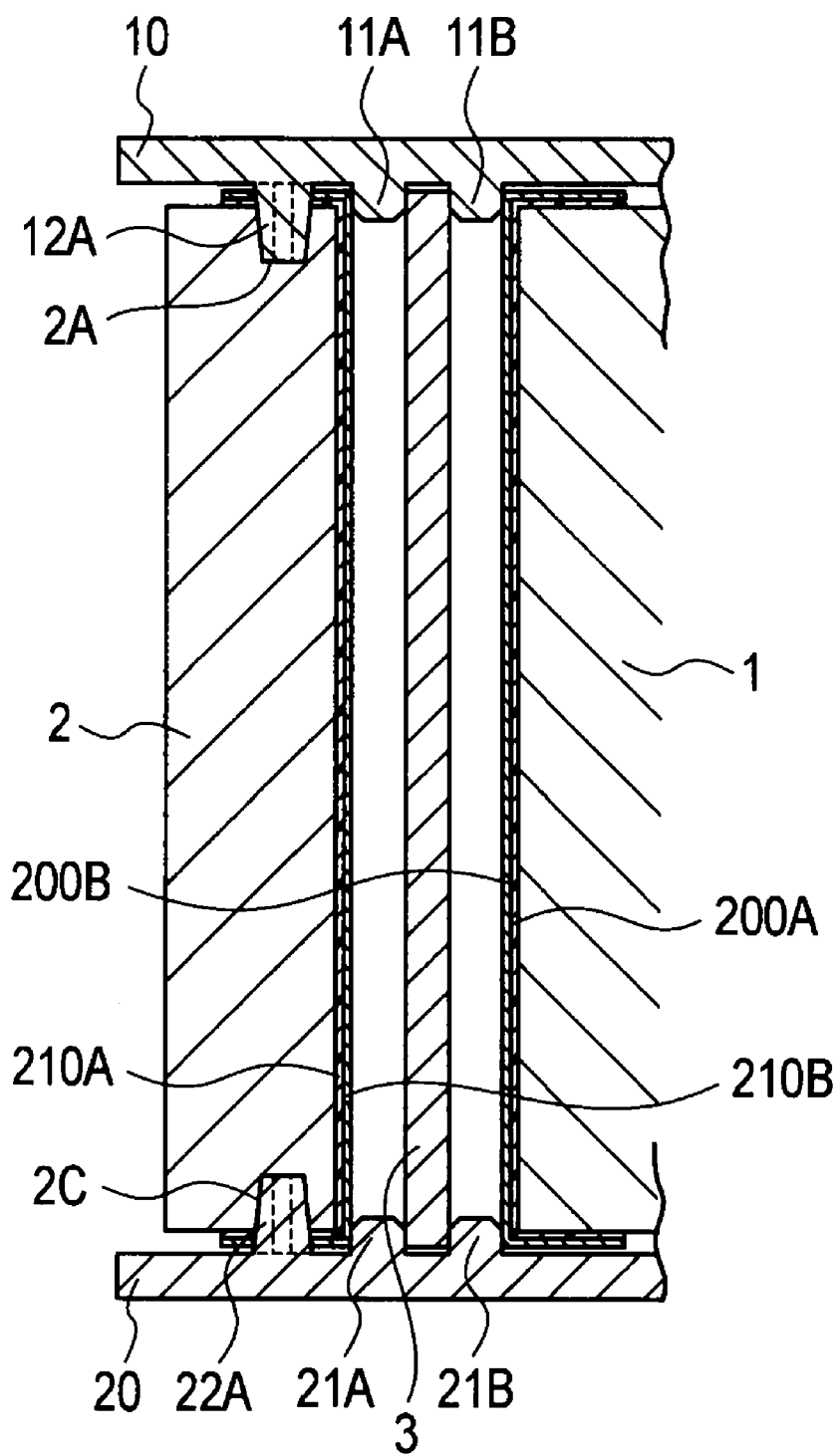
FIG. 10 is a cross-sectional view, taken along a position of the line A-A' as shown in FIG. 6, of the electronic device according to the second embodiment of the present invention.

Now, as shown in FIG. 10, a convex portion 11B provided on a first supporting member 10 is fitted into a gap between the first heat transferring body 200 and the substrate 3, and a convex portion 11A provided on the first supporting member 10 is fitted into a gap between the second heat transferring body 210 and the substrate 3.

In addition, a convex portion 21B provided on a second supporting member 20 is fitted into a gap between the first heat transferring body 200 and the substrate 3, and a convex portion 21A provided on the second supporting member 20 is inserted between the second heat transferring body 210 and the substrate 3.

Alternatively, in the embodiment, the electronic device 100 may have a structure in which the first heat transferring body 200 is inserted between the substrate 3 and the storage device 1, and the second heat transferring body 210 is not inserted between the substrate 3 and the storage device 2.

In this case, the convex portion 11B provided on the first supporting member 10 is fitted into a gab between the first heat transferring body 200 and the substrate 3, and the convex portion 11A provided on the first supporting member 10 is fitted into a gap between the storage device 2 and the substrate 3.

In addition, the convex portion 21B provided on the second supporting member 20 is fitted into a gap between the first heat transferring body 200 and the substrate 3, and the convex portion 21A provided on the second supporting member 20 is fitted into a gap between the storage device 2 and the substrate 3.

As shown in FIG. 10, the heat transferring body 200 is formed of an insulating sheet 200A and a heat-conducting sheet 200B, and the heat transferring body 210 is formed of an insulating sheet 210A and a heat-conducting sheet 210B.

The heat-conducting sheets 200B, 210B are each made of aluminum, silver, copper, electrically conductive plastics, graphite (black lead), a heat pipe, a heatlane or the like, for example. The insulating sheets 200A, 210A are each made of plastics, rubber, insulating paper, ceramics or the like, for example.

In the embodiment, similar to the heat-conducting sheets 200B, 210B described above, the first supporting member 10 and the second supporting member 20 are each formed of a heat-conducting member.

According to the embodiment, heat can be released to the outside by way of the first heat transferring body 200 and the first supporting member 10, and by way of the second heat transferring body 210 and the second supporting body 20. Accordingly, temperatures of air between the substrate 3 and the first heat transferring body 200 or the second heat transferring body 210 that has risen due to the storage devices 1, 2 can be reduced.

Modified Example 1

A structure of mounting an electronic device into a housing according to a Modified Example 1 of the present invention will be described with reference to FIGS. 11 to 13.

In Modified Example 1 of the present invention, a space occupying body 2S is provided instead of the storage device 2 (the second storage device) described above.

The space occupying body 2S is to be used in a case where it is assumed that after purchasing an electronic device into which only one storage device 1 has been incorporated, a user wishes to add another storage device 2.

In such a case, the space occupying body 2S is configured to occupy a space within the housing 8 in which the storage device 2 will be added, and made of plastics, metal, or the like. Additionally, the space occupying body 2S may be formed in any shape.

In Modified Example 1, the space occupying body 2S and a connector 3B are connected with the largest surface of the space occupying body 2S being substantially parallel to a front surface and a back surface of the substrate 3.

In addition, in Modified Example 1, the first supporting member 10 is mounted to the electronic device 100 by fitting the convex portions 11B and 11D as well as 11A and 11C provided on the first supporting member 10 from above into a gap between the storage device 1 and the substrate 3 and a gap between the space occupying body 2S and the substrate 3, respectively.

In addition, similarly, in Modified Example 1, the second supporting member 20 is mounted to the electronic device 100 by fitting the convex portions 21B and 21D as well as 21A and 21C provided on the second supporting member 20 from below into a gap between the storage device 1 and the substrate 3 and a gap between the space occupying body 2S and the substrate 3, respectively.

In addition, in Modified Example 1, the protrusions 12B and 12D as well as 11A and 11C provided on the first supporting member 10 are fitted from above into holes 1A, 1B provided in the storage device 1 and holes 2A, 2B provided in the space occupying body 2S, respectively.

Furthermore, in Modified Example 1, the protrusions 22B and 22D as well as 22A and 22C provided on the second supporting member 20 are fitted from below into two holes (not illustrated) provided in the storage device 1, and hole 2C, and a hole (not illustrated) provided in the space occupying body 2S.

Figure 11:
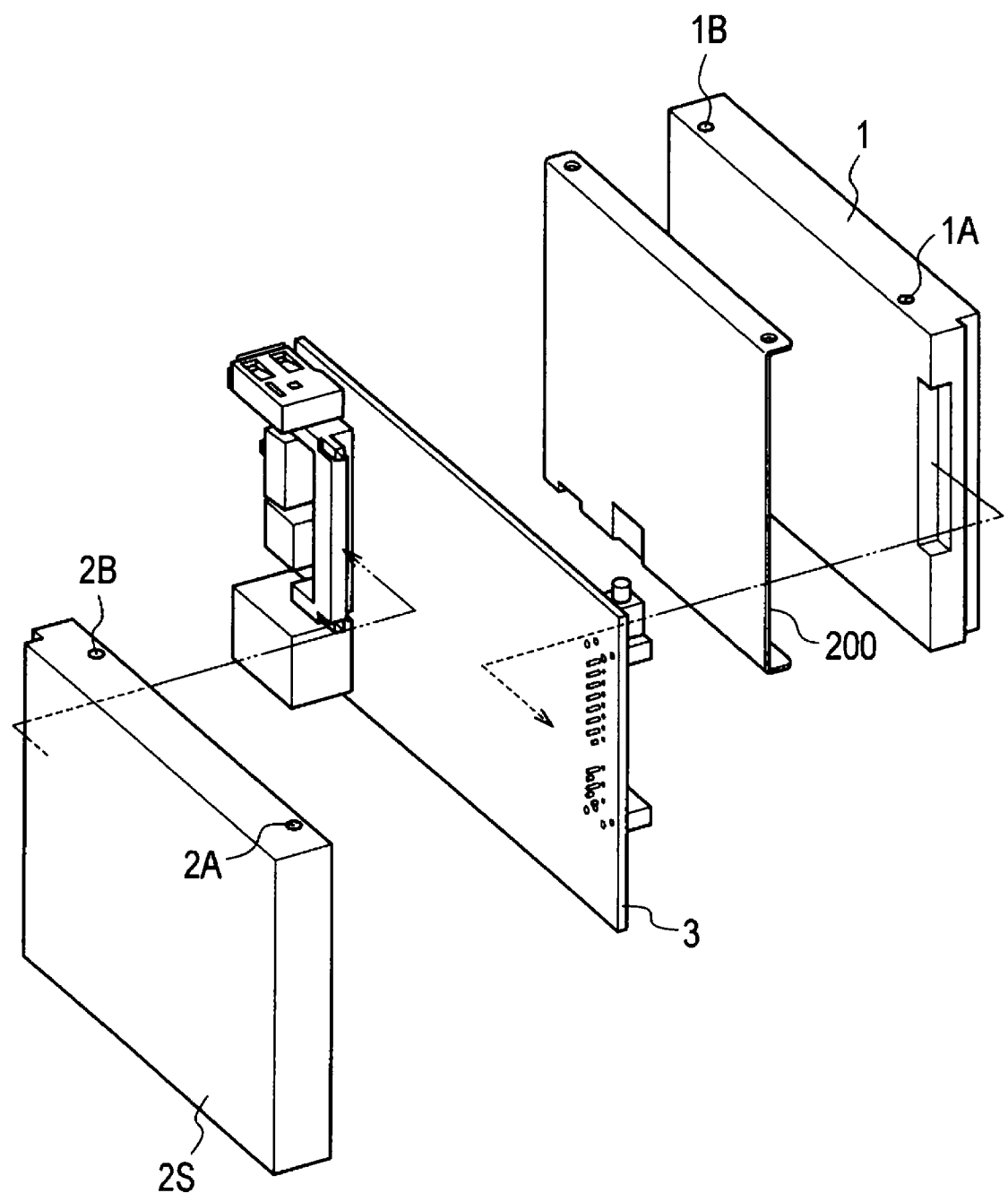
FIG. 11 is a an exploded perspective view of an electronic device according to Modified Example 1 of the present invention.
Figure 12:
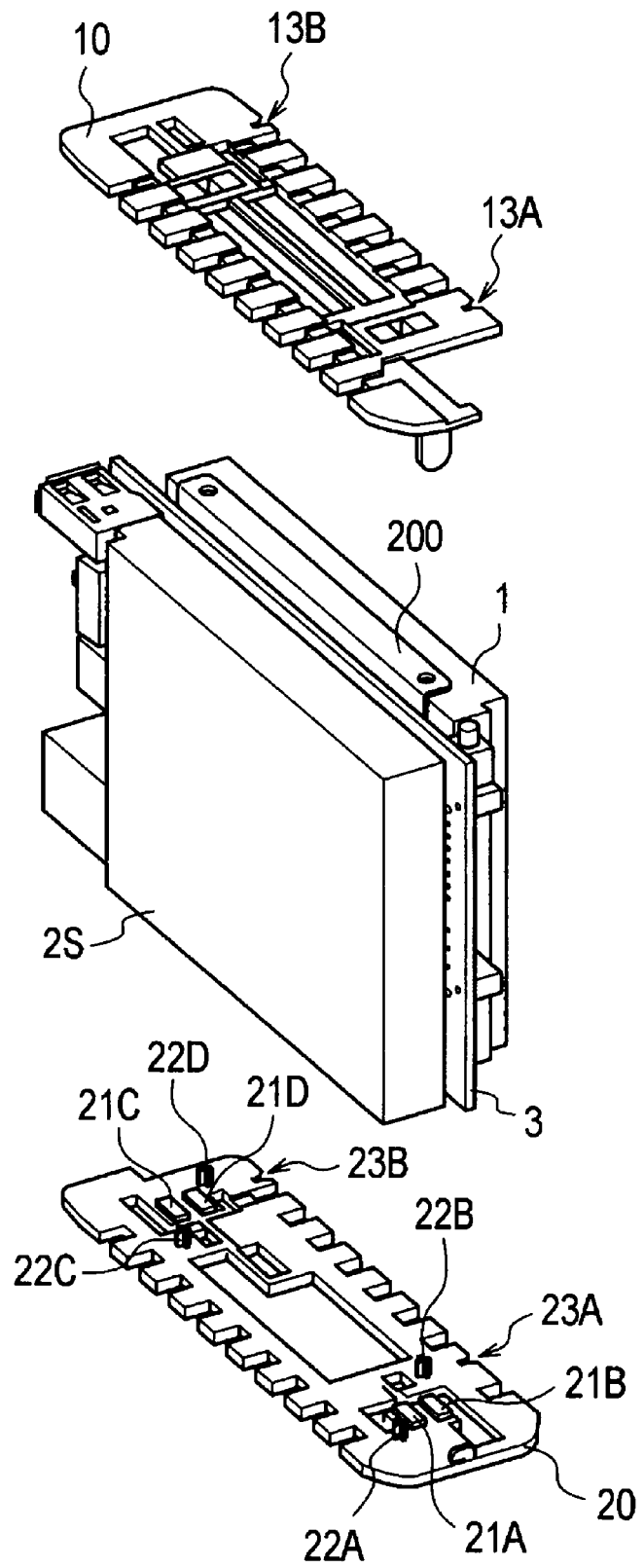
FIG. 12 is a view for describing how a first supporting member and a second supporting member are mounted to a first storage device and a space occupying body in an electronic device according to Modified Example 1 of the present invention.

Additionally, in Modified Example 1, in the electronic device 100, the heat transferring body 200 may be inserted between the substrate 3 and the storage device 1, as shown in FIG. 11 and FIG. 12.

Figure 13:
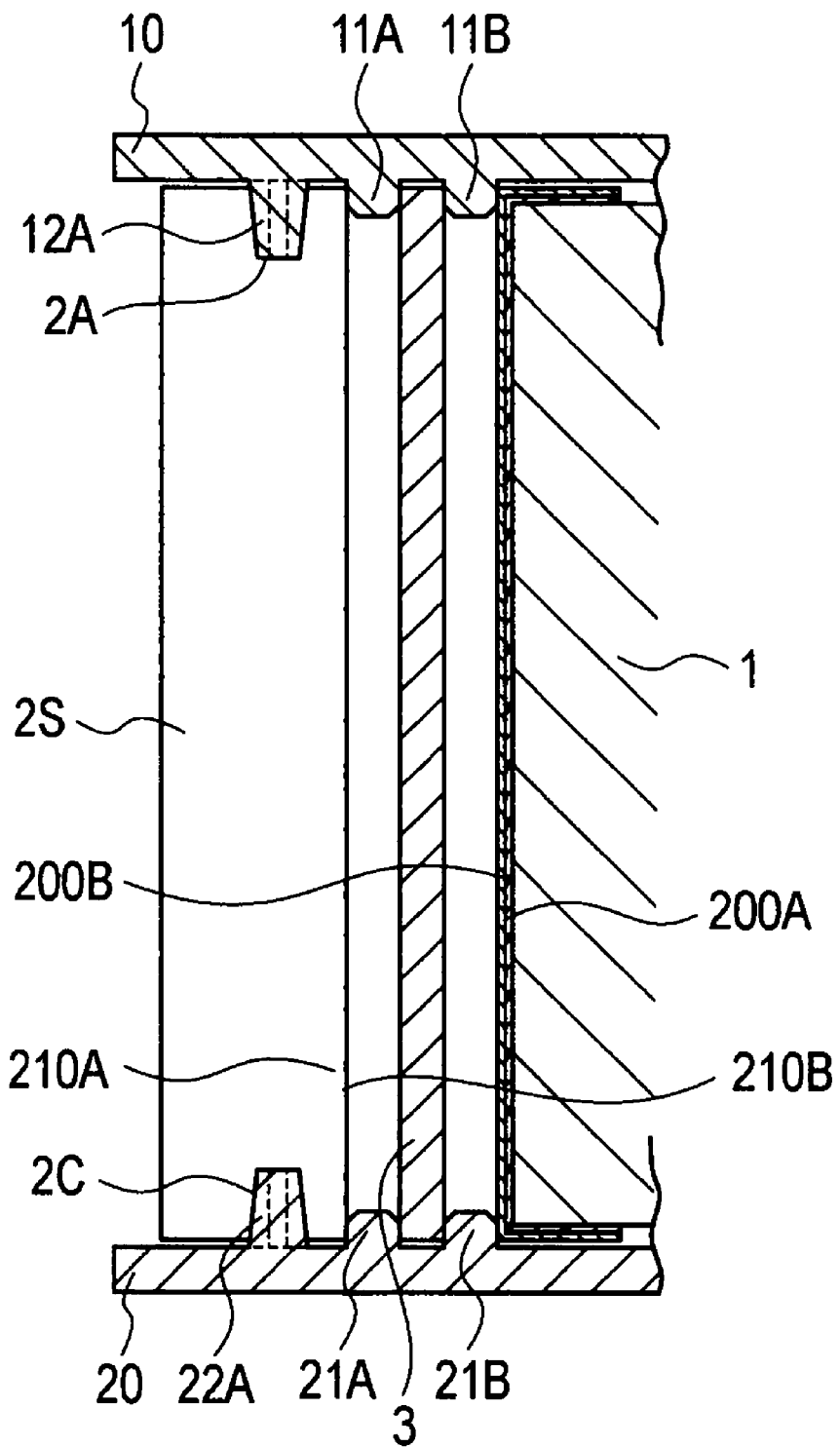
FIG. 13 is a cross-sectional view, taken along a position of the line A-A' as shown in FIG. 6, of the electronic device according to Modified Example 1 of the present invention.

In such a case, as shown in FIG. 13, the convex portion 11B provided on the first supporting member 10 is fitted into a gap between the first heat transferring body 200 and the substrate 3, and the convex portion 11A provided on the first supporting member 10 is fitted into a gap between the space occupying body 2S and the substrate 3.

In addition, the convex portion 21B provided on the second supporting member 20 is fitted into a gap between the first heat transferring body 200 and the substrate 3, and the convex portion 21A provided on the second supporting member 20 is fitted into a gap between the second heat transferring body 210 and the substrate 3.

Modified Example 2

A structure of mounting an electronic device into a housing according to Modified Example 2 of the present invention will be described with reference to FIGS. 14 to 16.

Figure 14:
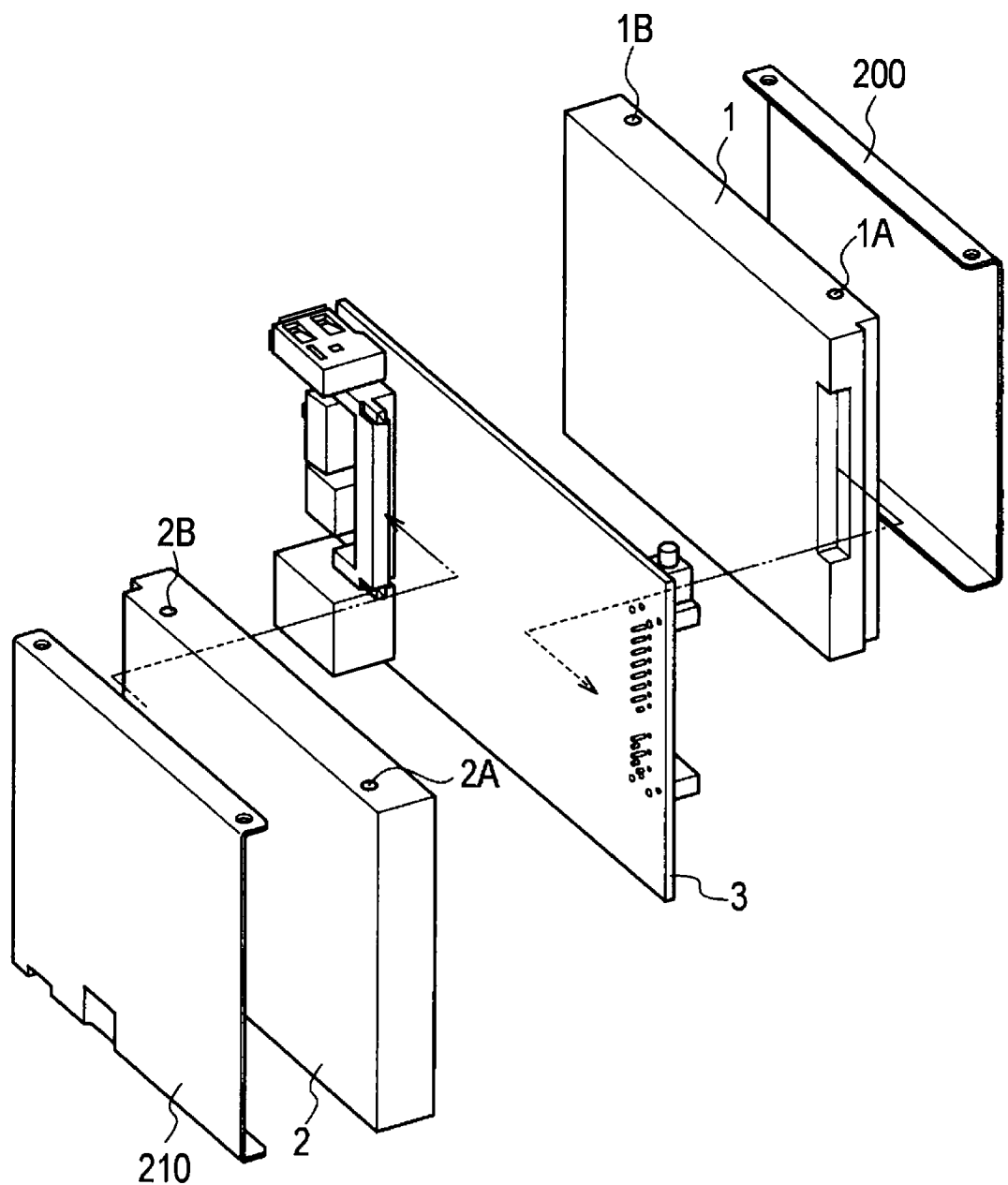
FIG. 14 is an exploded perspective view of an electronic device according to Modified Example 2 of the present invention.
Figure 15:
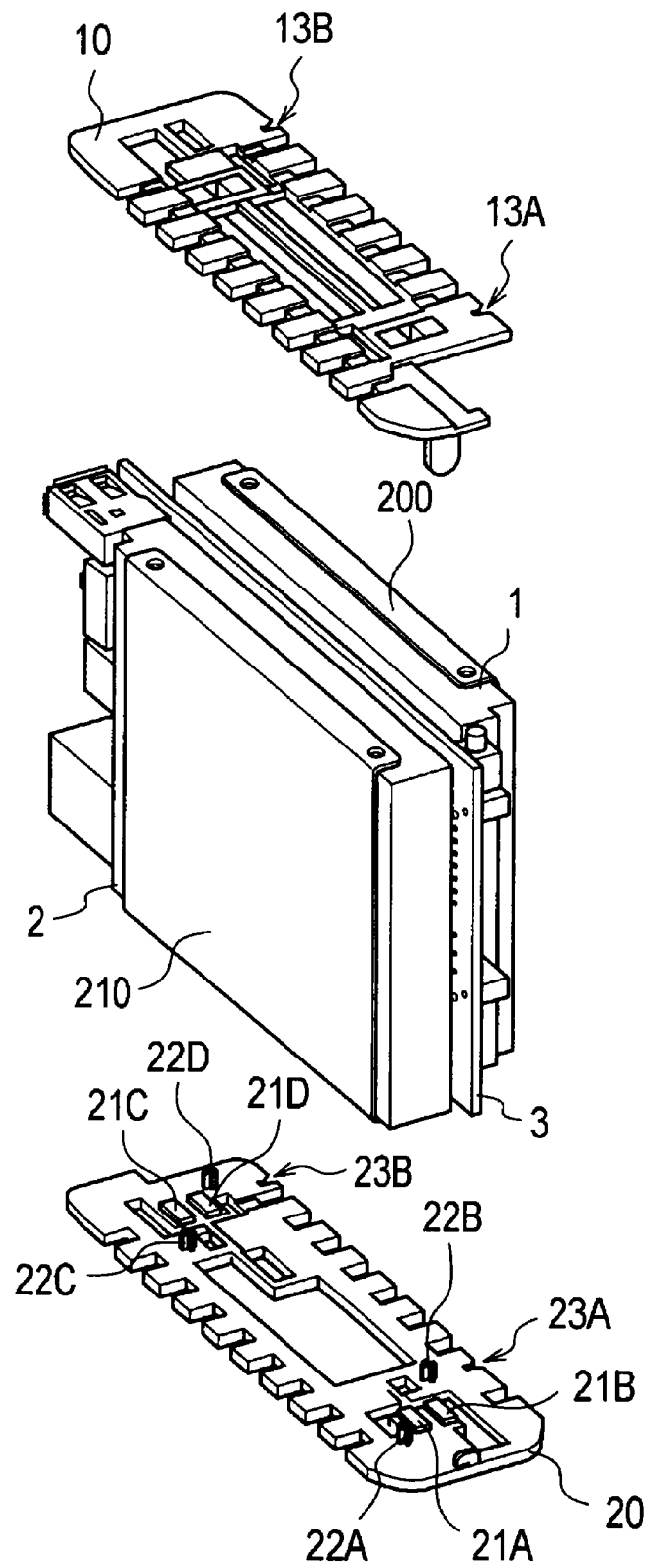
FIG. 15 is a view for describing how a first supporting member and a second supporting member are mounted to a first storage device and a second storage device, in an electronic device according to Modified Example 2 of the present invention.
Figure 16:
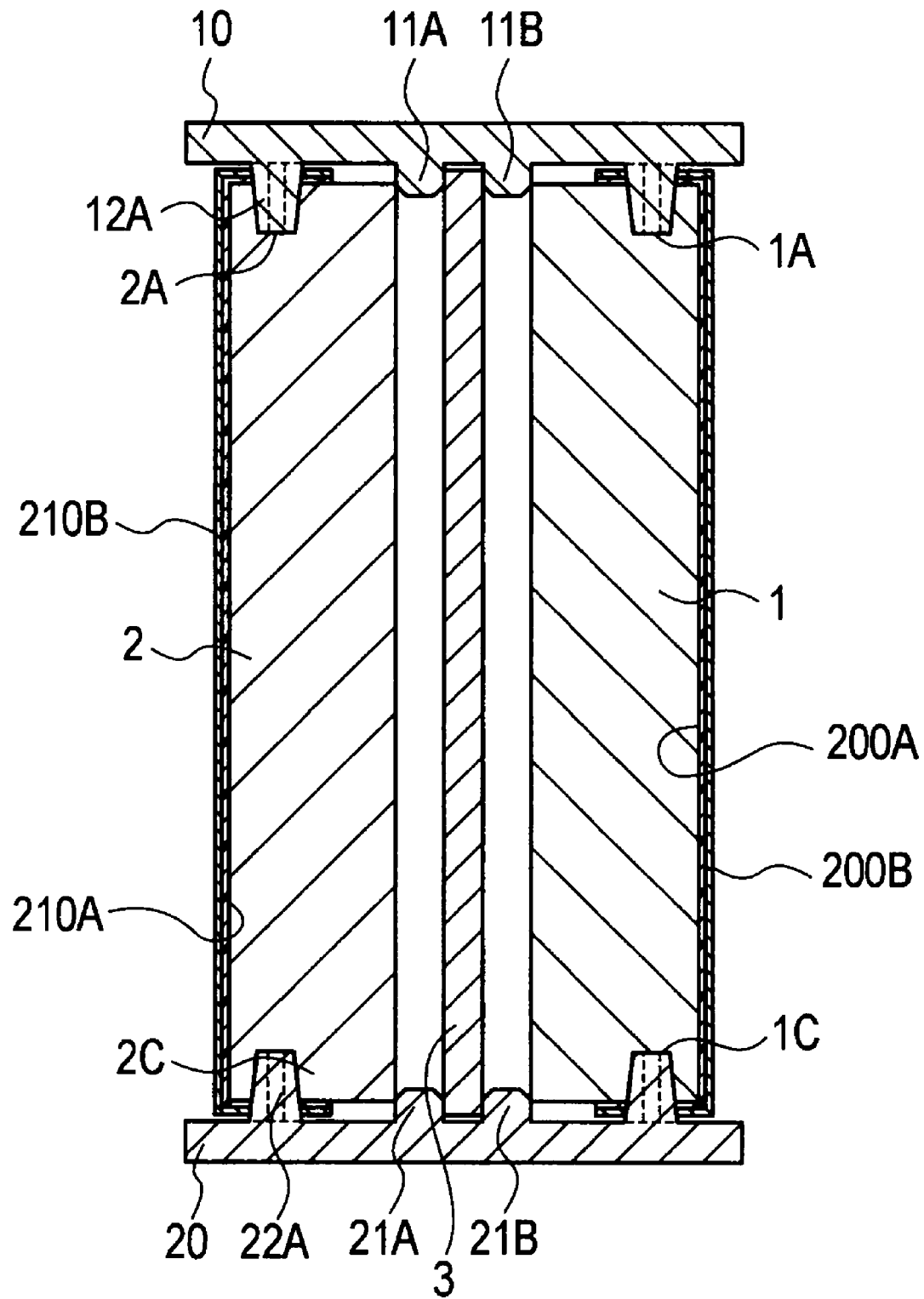
FIG. 16 is a cross-sectional view, taken along a position of the line A-A' as shown in FIG. 6, of the electronic device according to Modified Example 2 of the present invention.

As shown in FIGS. 14 to 16, in Modified Example 2 of the present invention, in the electronic device 100, a first heat transferring body 200 is inserted onto the outer side of a storage device 1, and a second heat transferring body 210 is inserted onto the outer side of a storage device 2.

Modified Example 3

A structure of mounting an electronic device into a housing according to Modified Example 3 of the present invention will be described with reference to FIGS. 17 and 18.

Figure 17:
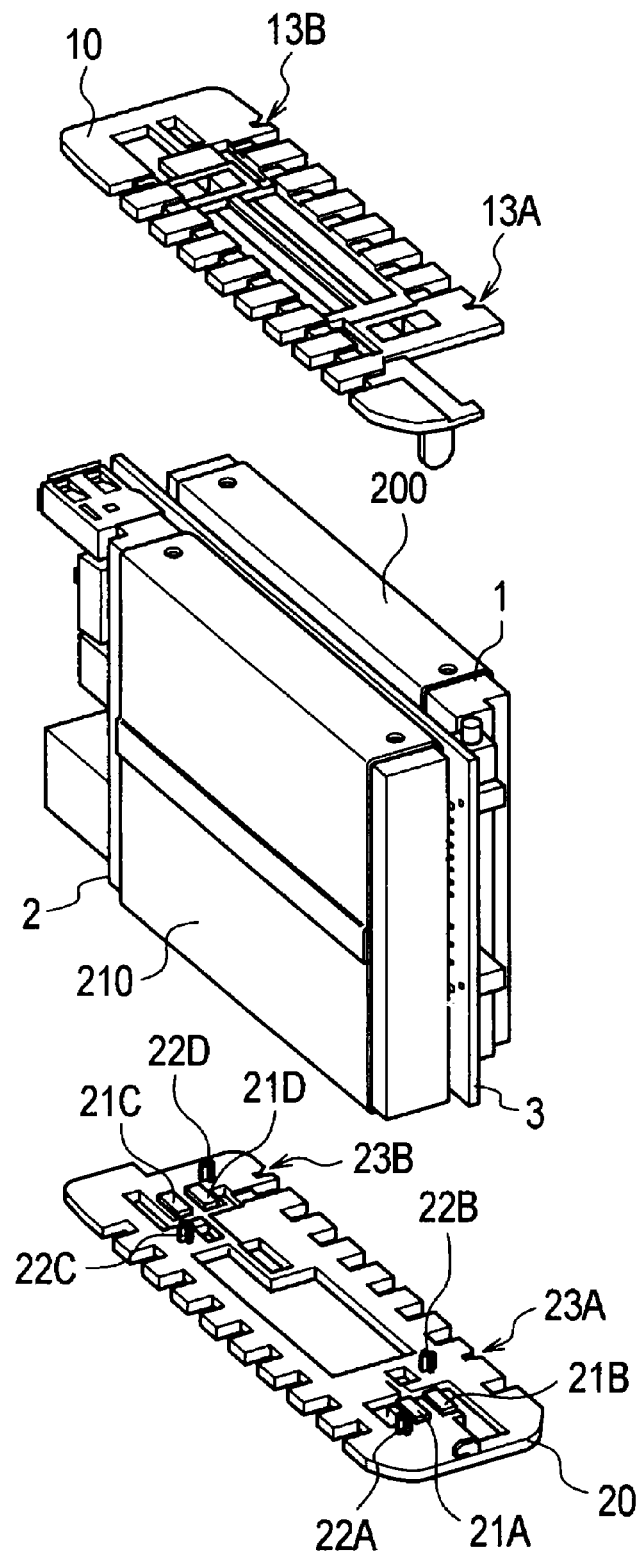
FIG. 17 is a view for describing how a first supporting member and a second supporting member are mounted to a first storage device and a second storage device, in an electronic device according to Modified Example 3 of the present invention.
Figure 18:
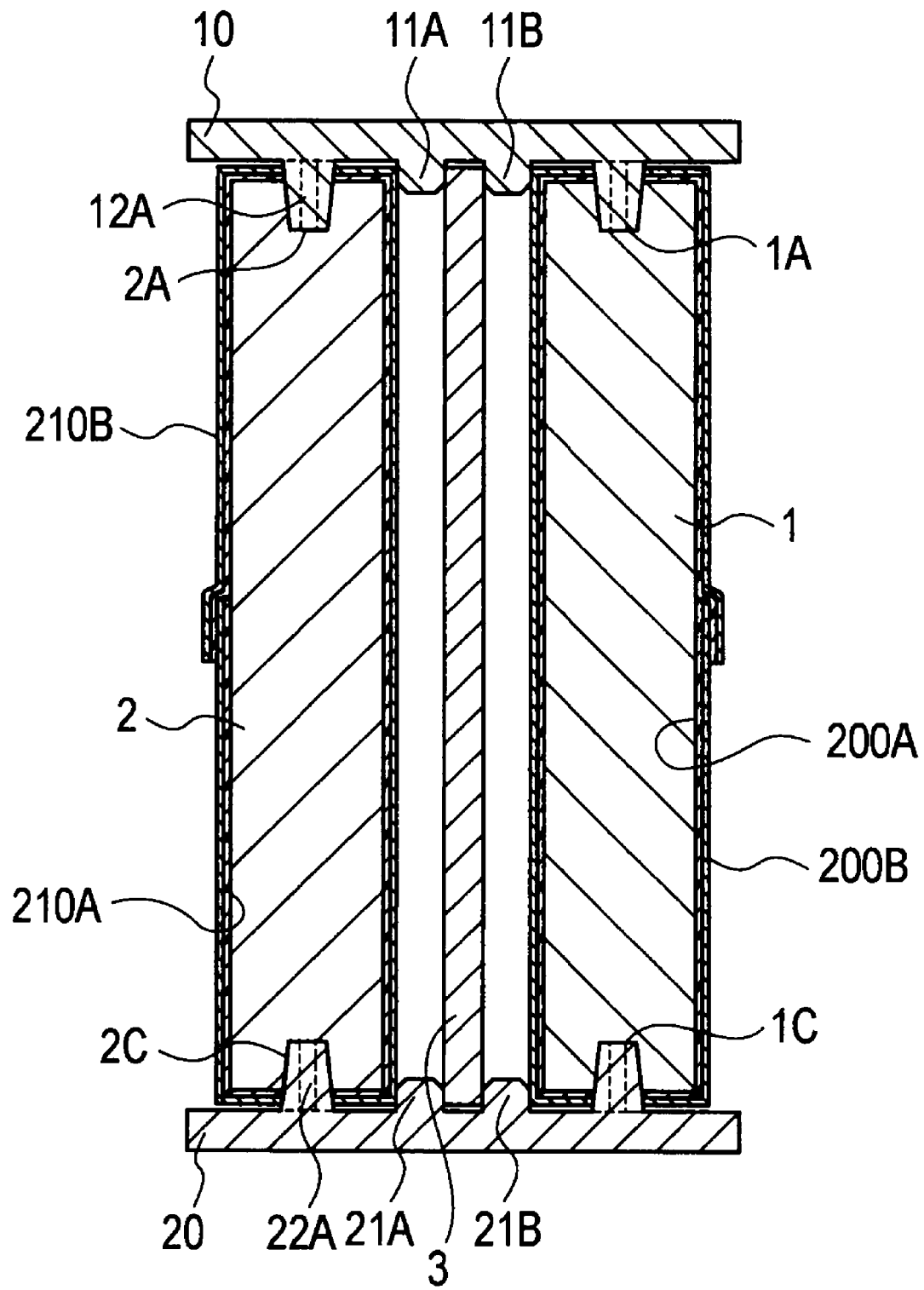
FIG. 18 is a cross-sectional view, taken along a position of the line A-A' as shown in FIG. 6, of the electronic device according to Modified Example 3 of the present invention.

As shown in FIGS. 17 and 18, in Modified Example 3, in the electronic device 100, a first heat transferring body 200 is configured to cover a whole circumference of a storage device 1, and a second heat transferring body 210 is configured to cover a whole circumference of a storage device 2.

The present invention has been described above in detail by use of the embodiment described above. However, it is obvious to those skilled in the art that the present invention is not limited to the embodiment described in the specification. The present invention can be implemented as corrected and modified aspects without departing from the spirit and scope of the invention to be defined by the description in "What is claimed is." Hence, the description of the specification is for illustrative purposes only, and is not intended to limit the present invention.

What is claimed is:

1. A structure of mounting an electronic device into a housing, comprising:
   a first supporting member configured to support the electronic device;
   a second supporting member configured to support the electronic device; and
   a cover configured to cover an opening formed in the housing,
   the electronic device including:
   a substrate;
   at least one connecting part provided on the substrate; and
   a storage device to be connected to the connecting part, wherein
   the first supporting member is mounted to the electronic device by fitting a convex portion from above into a gap between the storage device and the substrate, the convex portion being provided on the first supporting member,
   the second supporting member is mounted to the electronic device by fitting a convex portion from below into a gap between the storage device and the substrate, the convex portion being provided on the second supporting member, and
   the electronic device to which the first supporting member and the second supporting member are mounted is inserted from the opening into the housing, and fixed within the housing by the housing and the cover.

2. The structure according to claim 1, wherein
   the connecting part includes:
   a first connecting part provided on a front surface of the substrate; and
   a second connecting part provided on a back surface of the substrate,
   the storage device includes:
   a first storage device to be connected to the first connecting part; and a second storage device to be connected to the second connecting part, convex portions provided on the first supporting member are fitted from above into a gap between the first storage device and the substrate and a gap between the second storage device and the substrate, and convex portions provided on the second supporting member are fitted from below into a gap between the first storage device and the substrate and a gap between the second storage device and the substrate.

3. The structure according to claim 1, wherein
the connecting part includes:
- a first connecting part provided on a front surface of the substrate; and
- a second connecting part provided on a back surface of the substrate, the storage device is connected to the first connecting part, a space occupying body is connected to the second connecting part, convex portions provided on the first supporting member are fitted from above into a gap between the storage device and the substrate and a gap between the space occupying body and the substrate, and convex portions provided on the second supporting member are fitted from below into a gap between the storage device and the substrate and a gap between the space occupying body and the substrate.

4. The structure according to claim 1, wherein
a protrusion provided on the first supporting member is fitted from above into a hole formed in the storage device, and a protrusion provided on the second supporting member is fitted from below into a hole formed in the storage device.

5. The structure according to claim 4, wherein
the connecting part includes:
- a first connecting part provided on a front surface of the substrate; and
- a second connecting part provided on a back surface of the substrate, the storage device includes:
- a first storage device to be connected to the first connecting part; and
- a second storage device to be connected to the second connecting part, protrusions provided on the first supporting member are fitted from above into holes formed in the first storage device and the second storage device, and protrusions provided on the second supporting member are fitted from below into holes formed in the first storage device and the second storage device.

6. The structure according to claim 4, wherein
the connecting part includes:
- a first connecting part provided on a front surface of the substrate; and
- a second connecting part provided on a back surface of the substrate, the storage device is connected to the first connecting part, a space occupying body is connected to the second connecting part, protrusions provided on the first supporting member are fitted from above into holes formed in the storage device and the space occupying body, and protrusions provided on the second supporting member are fitted from below into holes formed in the storage device and the space occupying body.

7. The structure according to claim 2, wherein
in the electronic device, a first heat transferring body is inserted between the substrate and the first storage device, in the electronic device, a second heat transferring body is inserted between the substrate and the second storage device, and convex portions provided on the first supporting member and convex portions provided on the second supporting member are fitted into a gap between the first heat transferring body and the substrate and a gap between the second heat transferring body and the substrate.

8. The structure according to claim 3, wherein
in the electronic device, a first heat transferring body is inserted between the substrate and the storage device, in the electronic device, a second heat transferring body is inserted between the substrate and the space occupying body, and convex portions provided on the first supporting member and convex portions provided on the second supporting member are fitted into a gap between the first heat transferring body and the substrate and a gap between the second heat transferring body and the substrate.

9. The structure according to claim 2, wherein
in the electronic device, a first heat transferring body is inserted between the substrate and the first storage device, and convex portions provided on the first supporting member and convex portions provided on the second supporting member are fitted into a gap between the first heat transferring body and the substrate and a gap between the second storage device and the substrate.

10. The structure according to claim 3, wherein
in the electronic device, a first heat transferring body is inserted between the substrate and the storage device, and convex portions provided on the first supporting member and convex portions provided on the second supporting member are fitted into a gap between the first heat transferring body and the substrate and a gap between the space occupying body and the substrate.

\* \* \* \* \*